United States Patent [19]

Antes

[11] Patent Number: 5,059,776

[45] Date of Patent: Oct. 22, 1991

[54] BAR CODE FIELD AND BAR CODE READER

[75] Inventor: Gregor Antes, Zürich, Switzerland

[73] Assignee: LGZ Landis & Gyr Zug AG, Zug, Switzerland

[21] Appl. No.: 392,276

[22] Filed: Aug. 10, 1989

[30] Foreign Application Priority Data

Sep. 30, 1988 [CH] Switzerland .................. 03645/88

[51] Int. Cl.$^5$ .............................................. G06K 7/10
[52] U.S. Cl. ................................... 235/457; 235/454; 235/462; 235/472; 359/2; 359/3; 359/15; 359/558
[58] Field of Search ............... 235/457, 462, 472, 454; 350/3.61; 250/566

[56] References Cited

U.S. PATENT DOCUMENTS

| | | |
|---|---|---|
| 3,988,572 | 10/1976 | Constant ........................... 235/457 |
| 4,108,367 | 8/1978 | Hannan . |
| 4,171,766 | 10/1979 | Ruell ................................. 235/457 |
| 4,211,918 | 7/1980 | Nyfeler et al. . |
| 4,568,141 | 2/1986 | Antes . |
| 4,743,744 | 5/1988 | Nakase et al. . |
| 4,743,773 | 5/1988 | Katana et al. . |
| 4,837,425 | 6/1989 | Edwards ........................... 235/457 |

FOREIGN PATENT DOCUMENTS

| | | |
|---|---|---|
| 0105099 | 4/1984 | European Pat. Off. . |
| 2395550 | 1/1979 | France . |
| 2490848 | 3/1982 | France . |
| 00805/88 | 4/1988 | Switzerland . |
| 594936 | 5/1988 | Switzerland . |
| 664030 | 6/1989 | Switzerland . |

Primary Examiner—Harold Pitts
Attorney, Agent, or Firm—Marmorek, Guttman & Rubenstein

[57] ABSTRACT

An article of manufacture contains a substrate which contains a bar code field containing bar elements and background elements. The bar code elements have embossed, optically-reactive, microscopic periodic, relief structures which are suitable for optical-machine readout. A readout device generates an incident light beam and contains photosensors to detect the diffracted light beams.

20 Claims, 2 Drawing Sheets

BAR CODE FIELD AND BAR CODE READER

FIELD OF THE INVENTION

The present invention relates to an article of manufacture including a substrate for supporting a bar code field arrangement. More particularly, the present invention relates to a bar code field containing encoded embossed relief structures for optical machine decoding. The information is optical machine readable by means of reflected or transmitted light, diffracted through angles and along directions corresponding to the data encoded in the embossed relief structures. The embossed relief structures have periodic and orientational variations which make them suitable for use in security and authenticity applications.

BACKGROUND OF THE INVENTION

A bar code field is generally known in the retail trade, for example. Such bar code fields are suitable to mark merchandise of all kinds and contain in coded form numeric information in the form of bar elements of different widths which are typically laid out across the long side of the bar code field. Depending on the application, different types of bar codes are used, e.g., according to MIL-STD-1189 or according to the "European Article Numbering Code".

The support material is most often paper, and the bar elements in the bar code field are therefore applied on a support by means of a simple printing process in a color that contrasts with the background.

Optical readers are known from U.S. Pat. No. 4,743,773 for example. The optical reader scans the bar code field in the longitudinal direction by means of an incident light beam, records the intensity values of the reflected radiation, converts these values into electric signals and transmits these to an evaluating device. The bar code is self-timing, so that the reader and the evaluating device are able to recognize the relative widths of bar elements following each other even when the reading speed is changed constantly. The evaluating device converts these signals into an appropriate code (e.g. binary number) and into an impulse signal by means of a predetermined algorithm for the purpose of further processing.

The French patent 2,490,848 and the U.S. Pat. No. 4,743,744 describe such systems comprising an optical reader and of an evaluating device which are able to read a bar code from the bar code field.

For certain applications the ease with which the bar code field can be produced is of great advantage. On the other hand it would be desirable if the bar codes could be used for the identification of documents such as bank notes for example, because of the simple and reliable readout afforded by bar codes. However, the ease of production rules out the application of conventional bar codes in such cases.

Furthermore, machine-readable diffraction-optical markings which are difficult to copy are known. They are for example embossed in the form of microscopic relief structures into a thin thermoplastic layer applied on paper, are provided with an optically active layer and are protected with a transparent coating material.

The relief structures can have cross-sections of known periodic functions with special frequencies of over 10 lines per millimeter effective for the diffraction of visible light. Limits due to manufacturing restrict the practically useful range to approximately 2,500 lines/mm. But cross-sectional forms with aperiodic functions which contain local spacial frequencies in that range, such as for example matte structures, are also usable. The difference in height of these relief structures is typically selected to lie between 50 nm and 10,000 nm.

Similar relief structures diffract incident light and contain authenticity information, for example in the form of images, the colors and luminosity of which depend on the viewing angle or the movement effects of which depend on the change of the viewing angle.

Such documents and processes for their manufacture are described in Swiss patent 594 936 and in Swiss patent application 00805/88-4.

OBJECT AND SUMMARY OF THE INVENTION

It is an object of the instant invention to provide an article of manufacture including a substrate or support for supporting a bar code field which is difficult to copy. Typically, the article of manufacture is a valuable document such as a bank note. Because the bar code field of the present invention is difficult to copy, it is suitable for the marking of bank notes and other valuable documents.

Illustratively, the object of the invention is realized by an optical machine readable bar code which comprises embossed, microscopic relief structures in each bar code element. A substrate, modified by the microscopic relief structure, is rendered optically reactive and will diffract an incident light beam at an angle and along a direction uniquely determined by the characteristics of the relief structure. The diffracted light beam, which can be transmitted or reflected, depending on the properties of the substrate, is read and decoded by optical-machine means.

Embodiments of the invention are explained below in greater detail through the drawings.

DETAILED DESCRIPTION OF PREFERRED EMBODIMENTS

Figure 1:
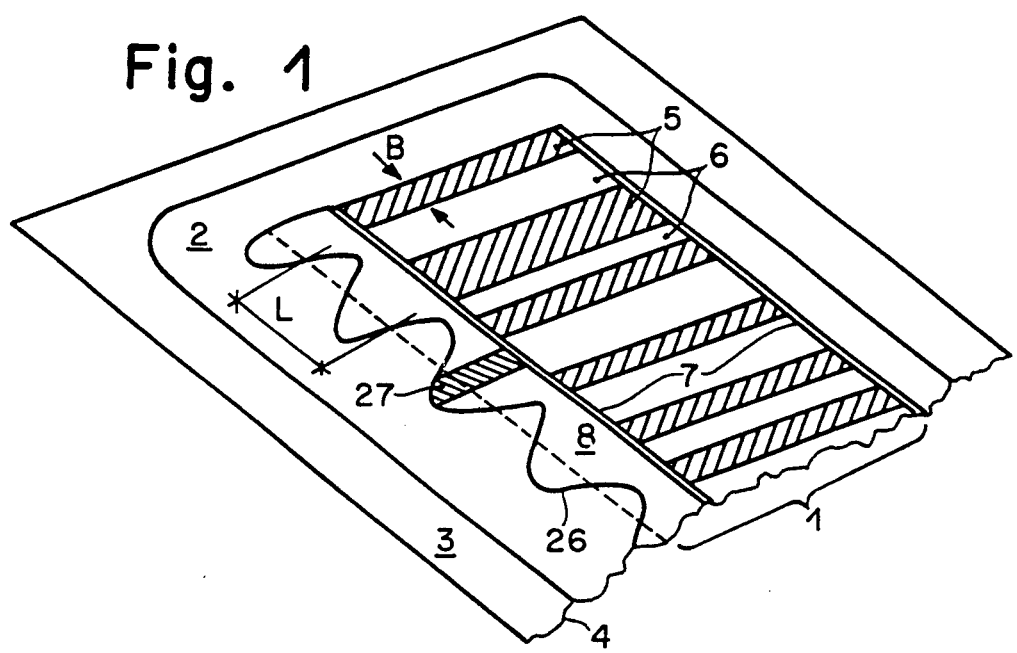
FIG. 1 shows an embodiment of a bar code field with diffraction elements, in accordance with an illustrative embodiment of the present invention.

In FIG. 1 a bar code field 1, a support or substrate 2 for the bar code field and an object or article of manufacture 3 (e.g. a valuable document) which is marked with the bar code field 1 are delimited on one side by a cut 4. The support 2 can be made in form of a self-sticking label, for example, and be bonded so firmly to the object 3 that said bar code field is destroyed if an attempt is made to loosen it. In another embodiment, the support 2 comprises a thin thermoplastic color layer applied on paper or of a film formed in a hot embossing process, as is known from Swiss patent 594,936.

The bar code field 1 comprises a number of encoded markings which are made up in turn by a predetermined number of rectangular bar elements 5 and background elements 6 with different widths B in the direction of readout.

The bar code field 1 is therefore divided into at least two partial surface groups. The bar elements 5 of the first partial surface group are hatched for clarity in the figures. Two adjacent bar elements 5 are separated by at least one background element 6. The background elements 6, together with the second partial surface group, constitute the background against which the bar elements 5 of the bar code field 1 stand out.

If at least one additional partial surface group is used, with partial surfaces alternating with the elements 5 and 6 in the sequence in bar code field 1, the possibilities of encoding are increased.

Furthermore a lateral border surface 8, which can delimit the bar code field on at least one longitudinal side 7 of the bar code field 1, is represented in FIG. 1 by a double line.

In each partial surface group as well as in the lateral border surfaces 8 if these are used, microscopic, predetermined relief structures are embossed or imprinted, for example by the method described in Swiss patent 664,030.

These relief structures are generally periodic and are given a spacial frequency f and azimuth angle $\phi$ as their most important parameters which determine the form and dimension of the relief profile.

Figure 2:
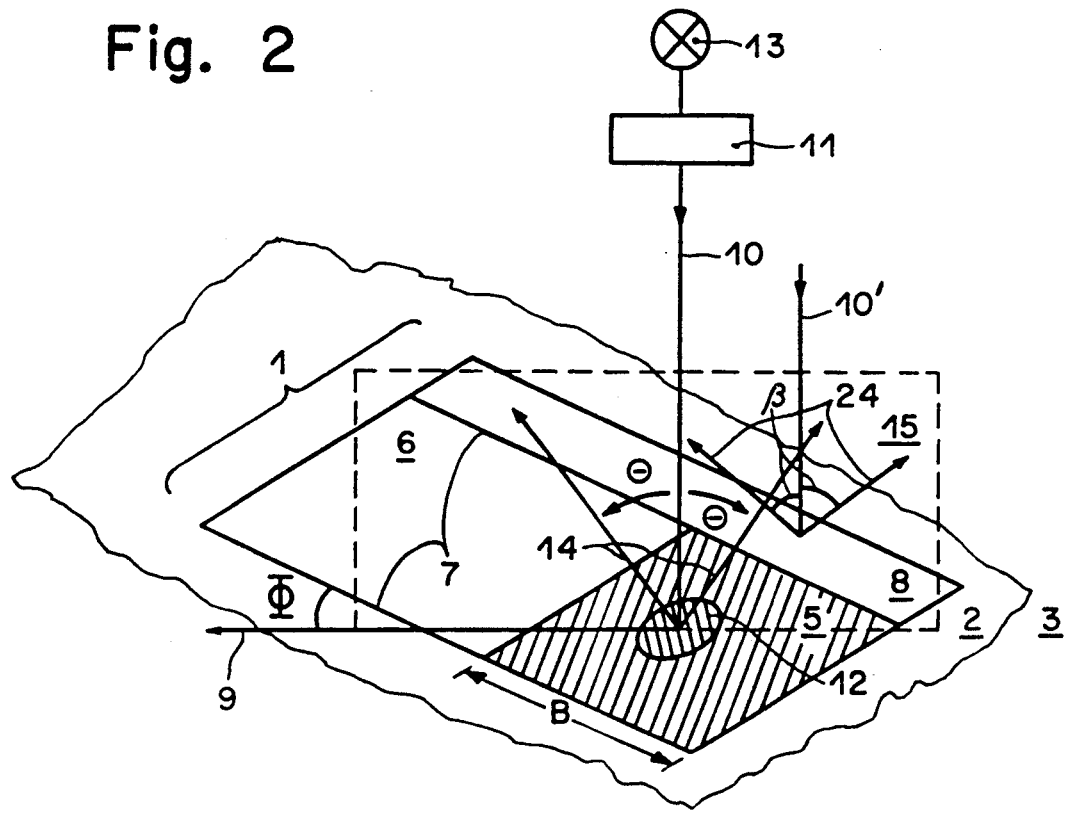
FIG. 2 shows an arrangement of light beams during readout of the bar code field of FIG. 1.

FIG. 2 shows details of the relief structure and readout arrangement.

The azimuth angle $\phi$ defines the orientation of a relief structure (e.g. 12 of FIG. 2) in relation to the bar code field 1 and constitutes the angle between the longitudinal side 7 of the bar code field 1 and a direction 9 of a grating vector of a relief structure (e.g. 12).

The printed bar code known in the retail trade utilizes the differences in absorption of the readout light as the sole parameter. In contrast to this binary system, the bar code with embossed relief structures has up to three parameters that are independent of each other, i.e., even an octal base is possible. The greater number of parameters used to differentiate the relief structures makes it possible to include additional security information in the same bar code field, for example.

Each of the three parameters used for the identification of the relief structure alone as well as their combinations can be used to build up an encoding in the bar code field 1, and a person schooled in the art would easily be able to derive other types in addition to the embodiments presented here.

It is possible, in particular, to use superimposed relief structures with at least two different spacial frequencies $f_A$ and $f_B$ and of different form and dimensions, for example with $f_A$ being in the range between 10 and 200 lines per mm and $f_B$ in the range between 50 and 2500 lines per mm.

Figure 3:
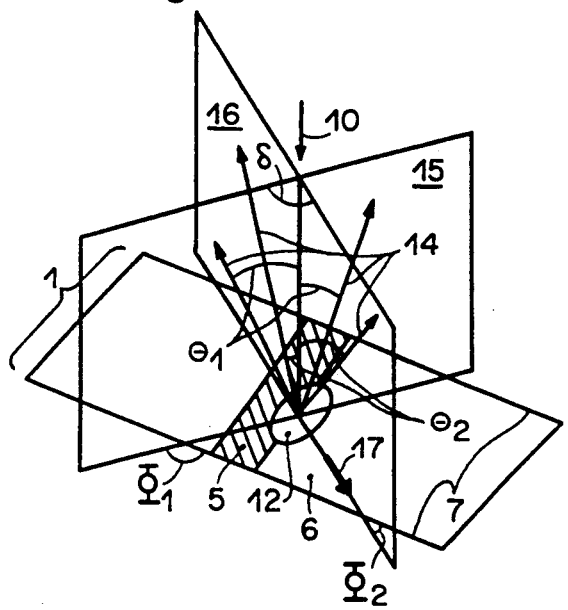
FIGS. 3 and 4 show an arrangement of light beams during illumination and readout of diffraction elements having different azimuth angles.

The borders of the different relief structures of the bar code field 1 which are shown in FIGS. 2 and 3 are limited only by the drawing possibilities, since the surface portions 5, 6 and 8 differentiate themselves only through the parameters of the embossed relief structures.

To read out the information contained in a relief structure, an optical reader is used which can be guided freely manually over the bar code field 1 or which is provided with a conveying device (not shown) for the object 3. The reader produces a readout light beam 10 (see FIG. 2) with light in the visible or infrared range of the spectrum.

The relief structures are readable in transmission or in reflection, with an optically active intermediary layer according to Swiss patent 594,936, the material of the support 2 and the object 3 determining the best type of readout.

In reading the information in reflection, at least the coating material of the bar code field 1 is transparent to the readout light beam.

In reading the information in transmission, the support 2 and the coating material of the bar code field 1 are transparent to the readout light beam 10, with the surface of the microscopic relief structure being an interface surface between two materials with different indices of refraction. The object 3 is provided with a recess in the area of the bar code field 1 or is also transparent to the readout light beam 10.

The relief structures of the partial surface groups and the lateral border surfaces 8 modify the environmental light which they receive. According to the predetermined transparency of the coating material of the bar code, the bar code is visible to the eye in the environmental light or remains completely invisible to the naked eye. For machine-reading, an optical transparency of the coating in the wavelength range of the readout light suffices. For example, a visible marking of the bar code field 1 printed on the coating material is used advantageously to locate the bar code field 1, since in manual guidance of the optical reader the bar code field 1 is easy to locate and the information is easy to read out parallel to the longitudinal side 7.

The reader is provided with an optical installation 11 which forms the readout light beam 10. An illuminated relief structure 12 of the bar code field 1 therefore has a predetermined form, e.g., that of a circle, of a rectangle or of an ellipse, of which the dimension in the direction of reading, i.e., parallel to the longitudinal side 7 is smaller than the least width B of the elements 5 or 6. When a manually guided reader is sued, the form is preferably a circle in order to decrease the requirement that reading be done parallel to the longitudinal direction 7. If on the other hand the object 3 is moved by means of the conveying device parallel to the longitudinal direction 7, the rectangular form is preferable.

For machine-recognition it is preferable for the readout light beam 10 to be of one color to differentiate between different diffraction structures. It can be produced by means of an inexpensive semiconductor laser for example, which is used as a light source 13.

The reader guides the readout light beam 10 from beginning to end over the bar code field 1, parallel to the longitudinal side 7, whereby one of the elements 5 or 6 is being illuminated alternately. Every relief structure of both partial surface groups diffracts the readout light beam 10 which preferably falls perpendicularly on the bar code field 1 in a predetermined manner which is determined by the illuminated relief structure 12.

The illuminated relief structure 12 diffracts the readout light by a diffraction angle $\theta$ dependent on the wave length of the readout light and on the spatial frequency f. As shown in FIG. 2, light 14 is diffracted under diffraction angle $\theta$ into two symmetric directions ($\theta$, $\phi$) and ($\theta$, $\phi + 180°$) in relation to the perpendicularly falling readout light beam 10, whereby the diffracted light 14 and the readout light beam 10 define a plane 15 containing also the grid vector direction 9 of the illuminated relief structure 12 in the case of the perpendicularly incident readout light beam 10. The longitudinal side 7 with the plane 15 therefore also form the azimuth angle $\phi$.

The relief structures of the bar code field 1 (FIG. 3) can have the same, predetermined azimuth angle $\phi_1$ for each bar element 5 for example. It differentiates itself from the predetermined azimuth angle $\phi_2$ which is common to all background elements 6, by the difference $\delta$. When the perpendicular incident readout light beam 10 is shifted parallel to the longitudinal side 7 from a bar element 5 to a background element 6, the intensity of the light 14 diffracted in the directions $(\theta_1, \phi_1)$ and $((\theta_1, \phi_1 + 180°)$ decreases in plane 15 as a function of the illuminated surface portion of the bar element 5 while the intensity of alight 14 diffracted in a direction $(\theta_2, \phi_2)$ and $(\theta_2, \phi_2 + 180°)$ increases in a new plane 16 as a function of the illuminated surface portion of the background element 6. The orientation of the plane 16 is defined by a direction 17 of the structure vector of the background element 6 and by the readout light beam 10. The two planes 15 and 16 therefore also form the angle $\delta$. As soon as the readout light beam 10 only illuminates the background element 6 the diffracted light 14 can be found only in plane 16.

If the bar code field 1 contains additional partial surface groups with other orientations of the relief profile, these other relief profiles define additional planes 16 which differ from the plane 15 by various angles $\delta$.

If the relief profile has a symmetric configuration the intensities of the diffracted light 14 are distributed in the planes 15 or 16 symmetrically in relation to the perpendicular incident readout light beam 10 falling on the relief structure 12.

If on the other hand the relief profile has an asymmetric configuration, the intensity of the diffracted light 14 is greater in one predetermined direction than in the other as a function of the asymmetry.

Figure 4:
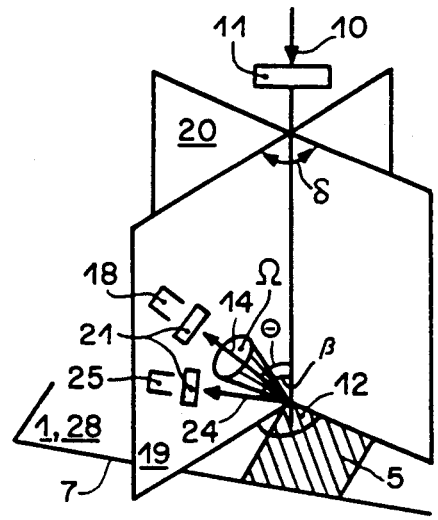

As shown in FIG. 4, the reader comprises at least one photosensor 18. The light 14 diffracted at the illuminated relief structure and falling into the photosensor 18 and the readout light beam 10 form the diffraction angle $\theta$ and define a readout plane 19. It is advantageous to use two photosensors 18 as a pair, arranged in readout plane 19 symmetrically in relation to the readout light beam 10 at the angle $\theta$. This makes it possible to ascertain the symmetry or asymmetry of the relief structure 12.

If the relief profile has an asymmetric configuration, the two photosensors 18 of a pair measure advantageously the intensity difference between the light 14 diffracted in direction $(\theta, \phi)$ and in direction $(\theta, \phi + 180°)$, e.g., in order to decrease the effects of extraneous light.

The bar code field 1 is preferably provided with a relief profile with an asymmetric configuration and is part of a graphic representation formed with the parameters spacial frequency f and azimuth angle $\phi$ of the relief structure. The bar code with the elements 5 and 6 superimposed on the image defines the asymmetry of the relief profile for these two partial surface groups.

As shown in FIG. 4, it is also possible for the reader to be provided with at least one additional readout plane 20 to record the light 14 diffracted in that readout plane 20 by another relief structure. If these relief structures have an azimuth angle difference of $\delta$, the readout planes 19, 20 also form preferably the difference angle $\delta$.

In reading the bar code, the readout light beam 10 desirably falls perpendicularly on the plane of support 2 while the readout planes 19, 20 defined by the photosensors 18 coincide with the planes 15, 16 (FIG. 3) defined through the diffraction process. Additional deviations from these conditions are to be expected with a thin support 2 on a non-flat object 3, e.g., on a crumpled bank note. Here the readout light beam 10 varies in different, non-defined ways from the perpendicular to the surface element from one surface element of support 2 to the other.

The photo-detectors 18 (FIG. 4) of the reader have preferably a wide acceptance angle and record all of the light 14 diffracted in a solid angle $\Omega$. This can be achieved by means of a photosensor 18 with a large light-sensitive surface or by means of an optical means 21 upstream of the photosensor 18 which concentrates the diffracted light 14 on a point-shaped photosensor 18.

A lens or mirror system or an optical diffraction focusing element can be used as the optical means 21 and for the optical device 11. The optical diffraction element has a relief structure that is similar to a diffraction grating but due to the form and dimensions of the relief structure it is able to focus light that is incident at a predetermined angle in a predetermined focal point. Such optical focusing elements are known in transmission and reflection, such as for example holographic optical elements (HOEs).

In another embodiment of the bar code field 1 the elements 5 and 6 are different in that only one of the two partial surface groups has a periodic relief structure, e.g. the bar elements 5, while the background elements 6 are engraved with a matte structure.

Simple straight-line diffraction gratings with symmetric or asymmetric relief profiles are advantageous, but other types of relief structures, the form of which is only limited by the embossing or imprinting technology, can also be used.

In particular uni-directional matte structures can be used. These are grating structures, the grid constant of which varies statistically from location to location, whereby the elements 5 and 6 are differentiated through the azimuth of the relief structure.

For example, the parameters of the gratings, whose elements 5 and 6 belong to N different partial surface groups, differentiate themselves only in their N spacial frequencies $F_1$, $F_2$ etc. and all have the same azimuth angle $\phi$. The light 14 diffracted by the elements 5, 6 etc. then appears under the N diffraction angles $\theta_1$, $\theta_2$ in accordance with the number N of the partial surface groups. The photosensors 18 of the reader for such a bar code field 1 have the largest possible acceptance angle, whereby the range within the azimuth angle amounts to a full 360° and the range of the diffraction angle $\theta$ is divided into N angle ranges.

Figure 5:
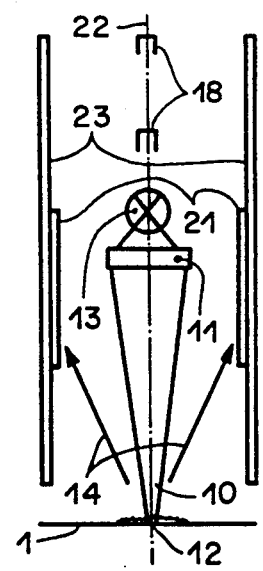
FIG. 5 shows an embodiment of a reader for reading bar code fields comprising diffraction elements.

According to FIG. 5 the reader has advantageously a symmetric structure and can be built into a hollow cylinder 23 for example, on the axis 22 of which the illumination source 13 with the optical device 11 is arranged so that the readout light beam 10 is cast in a direction along axis 22 on the illuminated relief structure 12 of the bar code field 1 located outside the hollow cylinder 23. A distancing device (not shown) guides the reader at a predetermined distance across the bar code field in such manner that the optical axis 22 is nearly perpendicular to the central plane of the bar code field 1. The diffracted light 14 falls on the optical means 21 installed all around on the inner wall of the hollow cylinder 23. They reflect the light 14 diffracted at the diffraction angles $\theta_1$, $\theta_2$, etc. in a focusing manner on one of the N photosensors 18 which are located behind the illumination source 13 in one of the focal points corresponding to the N diffraction angles $\theta_1$, $\theta_2$, etc. on axis 22. This reader does not have a direction marked by azimuth and is suitable for manual guidance.

It is possible for the parameters of the gratings of the elements 5, 6 etc. of the partial surface groups to be differentiated only with respect to the value of their azimuth angle $\phi$. For example, such a bar code field 1 has two partial surface groups. The difference $\delta$ between the azimuth angle $\phi$ of the two grids is $\delta = 90°$, whereby the azimuth angle $\phi$ for the grids of the bar elements 5 has a value of $\phi_1 = 45°$ and has a value of $\phi_2 + -45°$ for the gratings of the background elements 6. The reader (FIG. 4) suitable for this bar code field 1 has a range from 20° to 80° for the acceptance angle for each photosensor 18 in the readout planes 19, 20 for the angle $\theta$, and for the azimuth angle $\theta$ has a range of $\pm 40°$ and is also suitable for manual guidance.

The relief structures of the elements 5, 6 have preferably no constant spacial frequency $f_1$, $f_2$ but are modulated with a predetermined spacial frequency amplitude A, whereby A is smaller than one half the difference between adjoining spacial frequencies $f_1$, $f_2$. In the illuminated relief structure 12 all the spacial frequencies within a frequency rang $f \pm A$ are therefore active. This causes a predetermined fanning of the diffracted light 14 in the plane 15, 16 and increases the reading reliability when a support 2 is not entirely even, for example, if the incident readout light beam 10 is not precisely perpendicular.

The bar code field (FIG. 2) can be provided with the lateral border surface 8 at least at one longitudinal side 7. A grating with the same parameters as the grating of the background elements 6 can for example be embossed into the lateral border surface 8. However, the grating of the lateral border surface 8 can also be different from the two relief structures of the element 5, 6.

The two gratings of the lateral border surfaces 8 can have a spacial frequency $f_s$ and be different from each other in the two azimuth angles $\phi_s$ by a difference $\alpha$. The gratings of the elements 5, 6 are predetermined by the spacial frequency f and the azimuth angles $\phi_1$, $\phi_2$. Advantageously the azimuth angle $\phi_s$ has the same value as the azimuth angles $\phi_1$, $\phi_2$ of the elements 5, 6 so that the reader may not be limited to the azimuthal direction. A part 10' (FIG. 2) of the rectangular readout light beam 10 illuminates the lateral border surfaces 8. Light is diffracted in the form of rays 24 at an angle $\beta$ which is different from angle $\theta$ in a plane assigned to azimuth $\phi_G$ and parallel to plane 15.

A reader for this design of the bar code field 1 (FIG. 4) is advantageously provided in each readout plane 19, 20 with pairs of photosensors 18, 25 placed symmetrically in relation to the readout light beam 10, whereby the photosensors 18 and the light 14 diffracted at an angle $\theta$ register and whereby the photosensors 25 receive the rays 24 diffracted at an angle $\beta$.

As an example, the optical means 21 of the photosensor 18 limits the usable solid angle $\Omega$ of the diffracted light 14 to a range of the diffraction angle $\theta$ between 20° and 45°, while the optical means 21 of the photosensors 25 accept the rays 24 within the range of angle $\beta$ between 46° and 80°.

It is also possible for the bar code field 1 (FIGS. 1 and 2) to be provided with at least one lateral border surface 8 the longitudinal border 26 of which has a predetermined form on a side away from the elements 5, 6, whereby the longitudinal border 26 is configured advantageously as a sine, rectangular, sawtooth or other periodic wave function with a predetermined wavelength L. The intensity of the rays 24 change therefore in function of an illuminated, variable surface portion 27 of the lateral border surface 8.

The wavelength L is advantageously a constant and monotone function and depends in a predetermined manner on the location on the longitudinal border 26. The instantaneous position of the readout light beam 10 in the bar code field 1 can be determined by a continual determination of the wavelength L from the intensity of the rays 24.

If two longitudinal border surfaces 8 are present, the wavelengths L of the two longitudinal borders 26 can be different.

The photosensors 25 transform the intensity of the rays 24 (FIG. 4) into electric signals, so that the wavelength functions of the longitudinal border 26 may be determined and the location of extreme values of the wave functions can be compared with the position of the encoded markings of the bar code field 1. The intactness of the bar code field 1 can thus be checked and each of the two lateral border surfaces 8 fulfills a security function.

Figure 6:
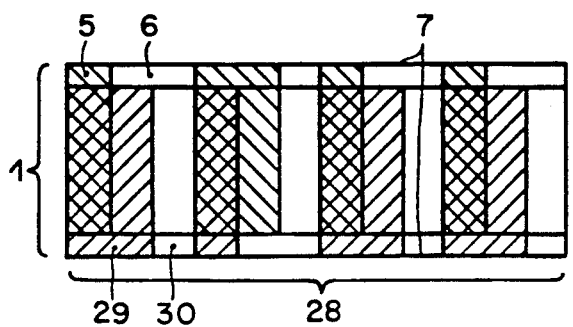
FIG. 6 shows an embodiment of the present invention in which two superimposed bar code fields are utilized.

In the bar code field 1 with a security function shown in FIG. 6, a second bar code 28 is superimposed on a first bar code. The first bar code is formed from the elements 5, 6. The second bar code 28 is made of bar surfaces 29 and neutral surfaces 30 and divides the bar code field 1 longitudinally into fields that follow each other and to which a predetermined number is assigned by the bar code 28. These numbers of the bar code 28 represent, for example, numbers for the numbering of adjoining fields in the bar code field 1. The bar code of the elements 5, 6 and the bar code 28 can also be encoded according to two different standards.

In the drawing, the different relief structures are represented by composite hatching, whereby the bar code 28 is shifted laterally in relation to the elements 5, 6 of the bar code field 1 for the sake of clarity of the drawing.

This double encoding requires complicated relief structures in the bar code field 1. They are determined by at least two parameters, with a first parameter, e.g. the spacial frequency f, being assigned to the elements 5, 6 and a second parameter, e.g. the azimuth angle $\phi$ being assigned to the surfaces 29, 30.

As an example the relief structure of the bar code elements 5 has the spacial frequency $f_1$ and the background element 6 the spacial frequency $f_2$, whereby the orientation of the relief structure is predetermined by the azimuth angle $\phi_1$ or $\phi_2$, according to the attribution to the bar surface 29 or to the neutral surface 30.

In FIG. 4 the reader receives the diffracted light 14 with the photosensors 18, 25 in each of the two readout surfaces 19, 20, e.g. in two ranges of the azimuth angle $\phi$ and in two ranges of the diffraction angle $\theta$. In the above example, the two photosensors 18, 25 of the readout surface 19 or 20 obtain the information of the ar code 28 (depending on the azimuth angle $\phi_1$ or $\phi_2$). The information of elements 5 or 6 are obtained from the signals of the photosensors 18 or 25 (depending on the spatial frequency $f_1$ or $f_2$) of the two readout surfaces 19, 20.

Advantageously, asymmetric relief profiles are suitable in this embodiment for the bar code field 1. The relief profiles of the elements 5 and 6 are different, for example, in the spacial frequency f and are arranged in the bar surfaces 29 according to their asymmetry in a mirror image to those of the neutral surfaces 30. The boundaries of the surfaces 29, 30 and those of the elements 5, 6 should not coincide in the direction of longitudinal side 7. The elements 5, 6 have therefore surface portions of both asymmetries in a predetermined manner.

A reader for this embodiment of the double-encoded bar code field 1 is barely limited in the azimuthal direction with a usable range of ±40° for the azimuth angle φ and has two pairs of photosensors 18, 25 in a readout plane 19 or 20. When reading out the information of the bar code field 1, the sums of the output signals of each pair of photosensors 18, 25 are evaluated. The information of the bar code 28 is contained in the difference of the output signals of each pair of photosensors 18, 25.

When the signals of the reader are evaluated, evaluation electronics (not shown) can, for example, check the sequence of the surface of bar code field 1, numbered by the bar code 28, and compare the decoded sequences with a predetermined one.

If the readout information does not have an asymmetric disposition as predetermined by the standard after decoding in the evaluating electronics (not shown), said evaluating electronics then checks whether the bar code field 1 has been read backwards and resets backward read information automatically in the correct direction.

The bar code field 1 with a security function is advantageously usable for valuable documents, since it has the function of an authenticity characteristic and contains information for the classification of the valuable documents, e.g. concerning value, origin and serial number.

Finally, the above-identified embodiments of the invention are intended to be illustrative only. Numerous alternative embodiments may be devised by those skilled in the art without departing from the spirit and scope of the following claims.

I claim:

1. An article of manufacture including a substrate for supporting a first bar code field, said first bar code field being self-timing and including optically encoded machine readable information, said first bar code field comprising bar elements of different widths separated by background elements, wherein at least said bar elements each comprise an optically-diffractive microscopic relief structures with a spatial frequency of over 10 lines per mm and a predetermined orientation defined by an azimuth angle.

2. The article of manufacture of claim 1 wherein said background elements each comprise a microscopic relief structure with a spatial frequency and an orientation defined by an azimuth angle, wherein all the relief structures of the bar elements have an identical first predetermined azimuth angle ($\phi_1$), wherein all the relief structures of the background elements have an identical second azimuth angle ($\phi_2$), and wherein, the first azimuth angle ($\phi_1$) and the second azimuth angle ($\phi_2$) differ by a predetermined angle amount ($\delta$).

3. The article of manufacture as recited in claim 2 wherein the relief structures of said bar elements differ from the relief structures of said background elements by an asymmetry in the profiles of said relief structures.

4. The article of manufacture as recited in claim 2 or 3, wherein the spatial frequencies are the same for all of said microscopic periodic relief structures.

5. The article of manufacture as recited in claim 1 or 2 wherein at least one of said relief structures is modulated by a spatial frequency of predetermined amplitude (A).

6. The article of manufacture of claim 1 wherein said substrate supports a second bar code comprising bar elements and background elements and wherein at least one encoded character of said first bar code field has an associated number in the second bar code field.

7. The article of manufacture of claim 6 wherein the bar and background elements of the first bar code field differentiate themselves by a first parameter determined by said elements of said first bar code field by a second parameter determined by the elements of the second bar code field, wherein said first parameter is the spatial frequency of the elements of the first bar code field and the second parameter is an asymmetry of the element of the first bar code field.

8. The article of manufacture as recited in claim 1, wherein said substrate supports a lateral surface portion alongside said bar code field, said lateral surface portion having a longitudinally extending, optically-diffractive, microscopic relief structure.

9. The article of manufacture as recited in claim 8, wherein said relief structure of said lateral surface portion has a spatial variation in the longitudinal direction with a predetermined wavelength.

10. The article of manufacture as recited in claim 1, wherein said substrate has a transparent coating and the reading of said bar code field utilizes reflection of incident light.

11. The article of manufacture as recited in claim 10, wherein said bar code field is visible through said transparent coating.

12. The article of manufacture as recited in claim 1 wherein said substrate comprises a self-adhesive label.

13. The article of manufacture is a valuable document, and wherein said bar code field contains information relating to said document and is located at a predetermined region of said valuable document.

14. An apparatus for readout of a self-timing bar code field having a predetermined sequence of bar code elements of different widths separated by background elements for encoding information, each of said bar code elements having an optically-diffractive, microscopic periodic relief structure comprising a plurality of lines with a predetermined spatial frequency and a predetermined angular orientation for diffracting incident light, said readout apparatus, comprising:

a light source for generating a readout light beam and for directing said light beam onto said bar code field, photosensor means for sensing a first diffracted light beam diffracted by said optically-diffractive, microscopic periodic relief structures of said bar code field, said photosensor means being located in a first plane defined by said readout light beam and said first diffracted light beam at a point where said photosensor means will intercept said first diffracted light beam, said photosensor means serving to convert said first diffracted light beam into an output signal.

15. The apparatus as recited in claim 14, wherein said apparatus further includes optical means located between said photosensor means and a relief structure illuminated by said readout light beam for focusing said diffracted light onto said photosensor means.

16. The apparatus as recited in claim 14, wherein said photosensor means comprises first and second photosensor devices located in said first plane so that light diffracted at either of a pair of predetermined azimuth angles ($\phi$ or $\phi + 180°$) is converted into an output signal.

17. The apparatus as recited in claim 14 wherein a second readout plane, non-co-planar with said first readout plane, is defined by a second diffracted light beam and said readout light beam and wherein second photosensor means are located in said second readout plane for detecting said second diffracted light beam.

18. An article of manufacture comprising a substrate for supporting a self-timing bar code field, said bar code field comprising a first sequence of bar code elements of different widths superimposed on a second sequence of bar code elements for encoding information, said bar code elements each having an embossed, optically-diffractive, microscopic periodic relief structure characterized by first and second independent physical criterion, said first independent physical criterion corresponding to said first sequence of bar code elements and said second independent physical criterion corresponding to said second sequence of bar code elements.

19. The article of manufacture as recited in claim 18, wherein said first independent physical criterion is the spacial frequency of said embossed, optically-diffractive, microscopic periodic relief structures and said second independent physical criterion is the degree of profile asymmetry of said embossed, optically-diffractive, microscopic periodic relief structures.

20. An apparatus for readout of a self-timing bar code field having a predetermined sequence of bar code elements of different widths separated by background elements for encoding information, each of said bar code elements having an optically-diffractive microscopic relief structure comprising a plurality of lines with a predetermined spatial frequency and a predetermined angular orientation for diffracting incident light, said apparatus comprising:

a housing, having an axis of symmetry;

a light source located within said housing on said axis so that an incident light beam, collinear with said axis is incident on said bar code field;

a first photosensor located on said axis so that said light source is between said bar code field and said first photosensor;

a second photosensor located on said axis so that said first photosensor is between said light source and said second photosensor, and axially symmetric optic means for directing a first diffracted light beam, diffracted at a first angle with said incident light beam, onto said first photosensor, and for directing a second diffracted light beam, diffracted at a second angle with said incident light beam, onto said second photosensor.

* * * * *